United States Patent [19]
Wehrle et al.

[11] Patent Number: 5,800,720
[45] Date of Patent: Sep. 1, 1998

[54] SPINNING FILTER SEPARATION SYSTEM FOR OIL SPILL CLEAN-UP OPERATION

[75] Inventors: John Wehrle, Greenbelt; Eugene C. Fischer, Stevensville; William P. Kenney, Annapolis; Joseph F. Korczynski; Thomas D. Gracik, both of Glen Burnie; Barbara F. Howell, Arnold; William Klemens, Severna Park, all of Md.

[73] Assignee: The United States of America as represented by the Secretary of the Navy, Washington, D.C.

[21] Appl. No.: 947,484

[22] Filed: Oct. 10, 1997

Related U.S. Application Data

[62] Division of Ser. No. 725,217, Sep. 26, 1996.

[51] Int. Cl.$^6$ .................................................. B01D 17/038
[52] U.S. Cl. ............................ 210/787; 210/794; 210/806
[58] Field of Search ........................ 210/252, 259, 210/297, 304, 323, 324, 360.1, 380.1, 321.67, 787, 791, 800, 788, 802, 799, 806

[56] References Cited

U.S. PATENT DOCUMENTS

| | | | |
|---|---|---|---|
| 1,553,141 | 9/1925 | Clark | 494/901 |
| 4,786,420 | 11/1988 | Delessandro | 210/806 |
| 5,149,432 | 9/1992 | Lavin | 210/380.1 |
| 5,160,444 | 11/1992 | McFarland | 210/806 |

*Primary Examiner*—David A. Reifsnyder
*Attorney, Agent, or Firm*—John Forrest; Jacob Shuster

[57] ABSTRACT

Oil spill polluted water is conducted under pressure in sequence through separator devices to collect and burn a polluted water mixture having its oil concentration increased by extraction of water therefrom during axial flow through the separator devices. Such water extraction is effected by sequential radial outflow through oil flow blocking filter walls of the separator devices in response to rotation thereof.

3 Claims, 2 Drawing Sheets

SPINNING FILTER SEPARATION SYSTEM FOR OIL SPILL CLEAN-UP OPERATION

This application is a division of application Ser. No. 08/725,217, filed Sep. 26, 1996 allowed.

This invention relates in general to the clean up of ocean water oil spills.

BACKGROUND OF THE INVENTION

According to current technology, effective clean up of oil spills from the surface of ocean water is performed by an oil sweeper vessel within which oil contaminated water is collected for transport to remotely located on-shore equipment within which oil separation and disposal is performed. The processing of large quantities of oil polluted ocean water is accordingly time consuming as well as costly.

It is therefore an important object of the present invention to provide a less costly oil spill clean up system involving more rapid processing of large quantities of oil polluted ocean water.

SUMMARY OF THE INVENTION

In accordance with the present invention, oil polluted ocean water is processed at an oil spill location by it's centrifugally induced continuous separation during pressurized flow of the water through at least two separator devices within which successive reduction in oil concentration is effected with respect to a separated portion of the water by filtered flow through porous membrane walls to correspondingly increase the oil concentration within the other remaining portion of water being processed. The first portion of the processed water when sufficiently reduced in oil concentration is discharged for return to the oil spill location, while the remaining portion is collected until a sufficient level of oil concentration therein is achieved to permit disposal thereof by burning at the oil spill site.

BRIEF DESCRIPTION OF THE DRAWING FIGURES

A more complete appreciation of the invention and many of its attendant advantages will be readily appreciated as the same becomes better understood by reference to the following detailed description when considered in connection with the accompanying drawing wherein:

FIG. 1 is a side elevation view with parts shown in section, of apparatus associated with the oil clean up system of the present invention; and FIG. 2 is a block diagram of the oil clean-up system embodying the apparatus shown in FIG. 1.

DETAILED DESCRIPTION OF PREFERRED EMBODIMENTS

Figure 1:
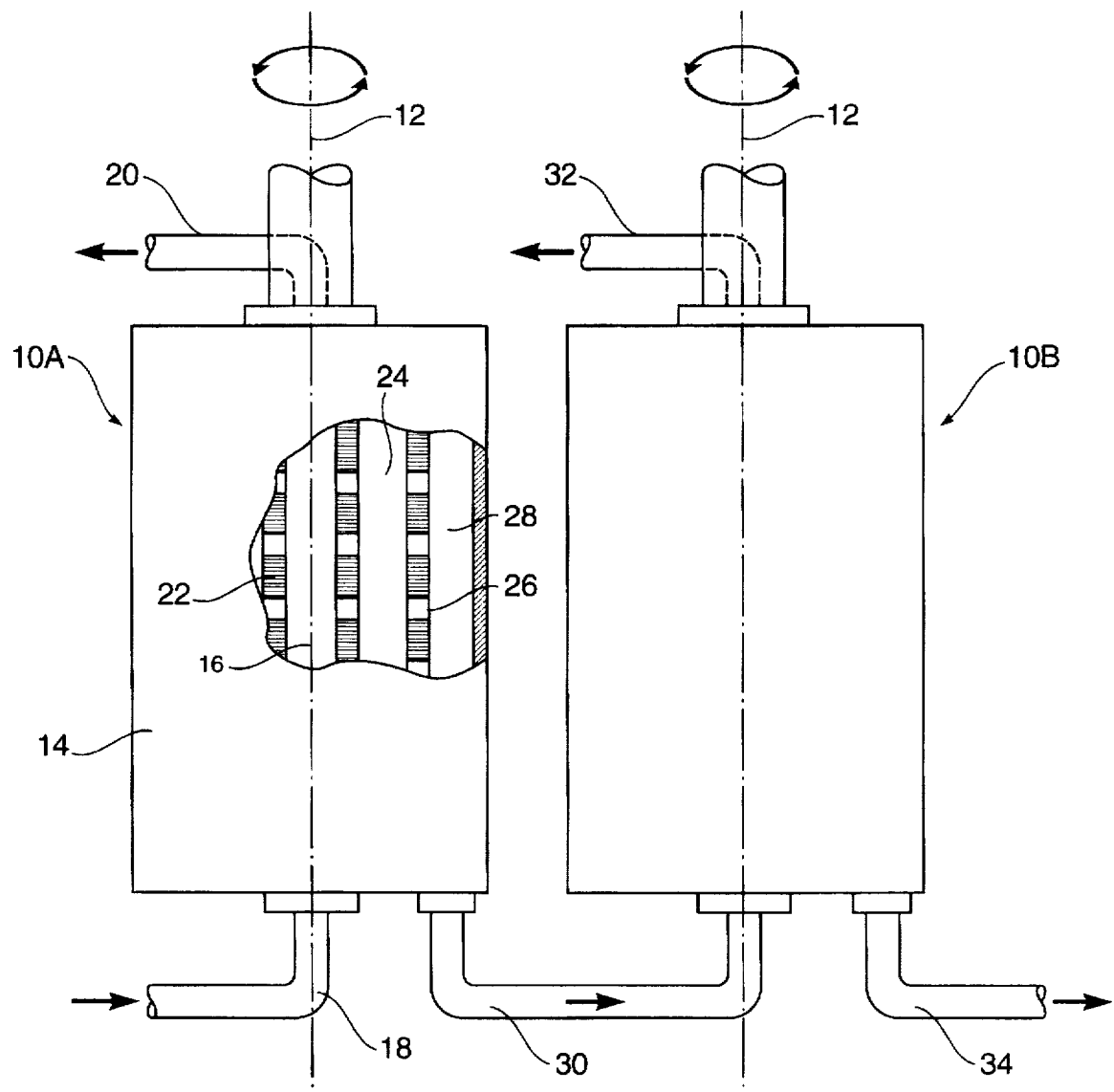

Referring now to the drawing in detail, FIG. 1 illustrates two separator devices 10A and 10B of similar construction associated with one embodiment of the present invention through which an oil spill clean up operation is performed. As shown, the separator devices are arranged in vertical parallel relation to each other for rotation of associated motor shafts 11 about axes 12 extending centrally through outer cylindrical housings 14 of the separator devices. An inner axial flow chamber 16 aligned with axis 12 is formed within each separator device to which axial flow of water under pressure as the fluent material being processed is conducted. Inflow to the inner chamber 16 of separator device 10A is conducted by conduit section 18 at the lower axial end of housing 14. Fluent material conducted through such axial flow chamber 16 is discharged from the upper axial end of housing 14 of separator device 10A through a conduit section 20.

The inner axial flow chamber 16 in each of the separator devices 10A and 10B is enclosed by a radially inner cylindrical porous wall 22 of a filtering arrangement. An annular chamber 24 is enclosed in surrounding relation to inner chamber 16 by a second cylindrical porous wall 26 radially spaced inwardly from the outer imperforate wall of the housing 14 to form a radially outer chamber 28 therein. Outflow from the bottom of chamber 28 in separator device 10A is transferred by conduit section 30 to the lower end of the inner axial flow chamber 16 of separator device 10B from which axial outflow is discharged at its upper axial end through conduit section 32. A continuous radial outflow through the filtering walls 22 and 26 in each of the separator devices 10A and 10B is thus established through conduit section 30 between chamber 28 in device 10A and the inner chamber in device 10B to its radially outer chamber so as to effect a successive reduction in concentration of a filter separated contaminant within the fluent material discharged from the lower end of the outer chamber of device 10B through conduit section 34, as shown in FIG. 1.

The radially inner filtering wall 22 of each separator device according to one embodiment is formed by a fluortex hydrophobic separation membrane with 50 μm pores therein which serves to prevent inflow of droplets of oil as the contaminant, larger than 50 μm, into the annular chamber 24 so as to thereby reduce oil concentration within the water being processed. A further reduction in oil concentration is then effected by inflow of the water being processed to chamber 28 through filtering wall 26 formed by a hydrophilic separation membrane with 2μm pores therein. The water so processed by radial outflow from chambers 16 and 24 respectively through the porous separation membranes of filtering walls 22 and 26 in separator device 10A is again so processed by radial outflow through comparable separation membranes within separator device 10B to supply a portion of the processed water to discharge conduit section 34 with a desired reduced concentration of oil therein. In order to maintain a proper continuous radial outflow through the separation membranes of the filtering walls 22 and 26 without clogging such chambers of, the separator devices 10A and 10B are rotated through the motor shafts 11 about the axes 12 thereof to centrifugally enhance the radial outflow through the filtering walls. The portions of the processed water mixtures respectively leaving the separator devices 10A and 10B through conduit sections 20 and 32 are correspondingly increased in oil concentration to an extent accommodating on-site disposal thereof by burning within a furnace after being collected within a reservoir tank or the like.

Figure 2:
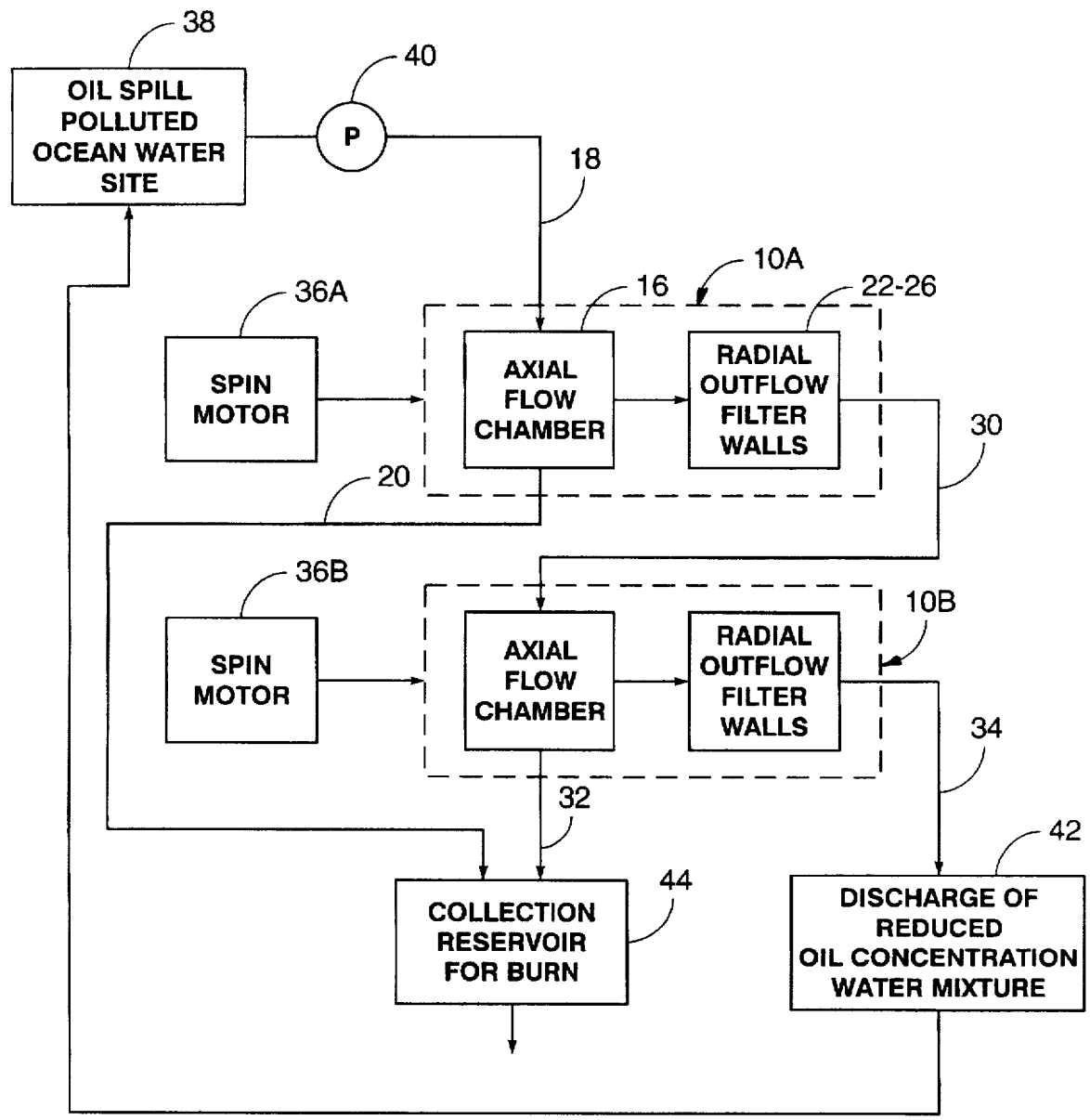

The oil spill clean up operation hereinbefore described in connection with the apparatus illustrated in FIG. 1, is summarized by reference to FIG. 2 diagramming the separator devices 10A and 10B moving their chambers 16 and 24 rotated by spin motors 36A and 36B through shafts 11 to centrifugally induce radial outflow as aforementioned as part of a system for clean-up of water polluted at an oil spill site or location 38. The polluted water from such location 38 is fed under pressure by pump 40 to the separator device 10A through conduit section 18 for axial flow through chamber 16 therein. The successively reduced concentration of oil within the portion of the processed water delivered through conduit section 34 from separator device 10B is discharged, as denoted in FIG. 2 by reference numeral 42, for return of sufficiently purified water to the oil spill site 38. The other portion of the processed water is continuously fed by conduit sections 20 and 32 from the inner chambers 16 of the separator devices for a sufficient period of time to a collection reservoir 44 within which the increased concentration of oil therein becomes high enough to permit on-site furnace combustion thereof.

Obviously, other modifications and variations of the present invention may be possible in light of the foregoing teachings. It is therefore to be understood that within the scope of the appended claims the invention may be practiced otherwise than as specifically described.

What is claimed is:

1. In combination with at least two separator devices through which polluted water is conducted in series for extraction of a contaminant therefrom, a clean-up method including the steps of: conducting the polluted water under pressure to one of the separator devices; rotating the separator devices to centrifugally induce radial outflow therefrom; filtering the radial outflow from said one of the separator devices for retention of the contaminant therein during conduction of the polluted water therethrough; transferring the filtered radial outflow from said one of the separator devices to the other of the separator devices; filtering the radial outflow from the other of the separator devices for further reduction in concentration of the contaminant within the polluted water; discharging the radial outflow of the polluted water from said other of the separator devices with reduced concentration of the contaminant therein after said filtering; and collecting the polluted water with increased concentration of the contaminant therein from each of the separator devices for disposal of the contaminant.

2. The method as defined in claim 1 wherein said contaminant is oil.

3. In combination with at least two separator devices through which polluted water is conducted in series for extraction of a contaminant therefrom, a clean-up method including the steps of: conducting the polluted water to one of the separator devices; and filtering outflow from each of the separator devices for reducing concentration of the contaminant in the polluted water during conduction thereof; the improvement residing in the steps of: effecting said outflows by inducement during the filtering of the polluted water and retention of the extracted contaminant within the separator devices; transferring the polluted water under the outflow inducement from said one of the separator devices to the other of the separator devices for further reduction in the concentration of the contaminant remaining within the polluted water after said filtering within said other of the separator devices; and disposing of the extracted contaminant in the polluted water collected by said retention thereof within each of the separator devices.

* * * * *